United States Patent [19]
Tanielian et al.

[11] Patent Number: 6,134,485
[45] Date of Patent: Oct. 17, 2000

[54] SYSTEM AND METHOD FOR MEASURING PHYSICAL PARAMETERS USING AN INTEGRATED MULTISENSOR SYSTEM

[75] Inventors: Minas H. Tanielian; Narnsoo Kim, both of Bellevue; Mark J. Holland, Port Orchard, all of Wash.

[73] Assignee: The Boeing Company, Seattle, Wash.

[21] Appl. No.: 09/252,584

[22] Filed: Feb. 18, 1999

[51] Int. Cl.[7] .................................................. B64C 11/34
[52] U.S. Cl. .................................. 701/14; 701/1; 701/2; 244/17.13; 244/200; 244/203; 73/178 T; 340/945; 340/973
[58] Field of Search ................................ 701/14, 1, 2, 7, 701/8, 9; 244/17.13, 200, 203; 73/178 T; 340/945, 973

[56] References Cited

U.S. PATENT DOCUMENTS

| | | | |
|---|---|---|---|
| 5,623,411 | 4/1997 | Morvan | 701/14 |
| 5,737,222 | 4/1998 | Palmer | 701/14 |
| 5,912,627 | 6/1999 | Alexander | 340/815.4 |
| 5,986,580 | 11/1999 | Permanne | 340/946 |

*Primary Examiner*—William A. Cuchlinski, Jr.
*Assistant Examiner*—Yonel Beaulieu
*Attorney, Agent, or Firm*—Brooks & Kushman P.C.

[57] ABSTRACT

A system and method for analyzing physical parameters of flight data at a plurality of discrete locations about a surface of an aircraft includes a multisensor system having an array of belts. Each belt includes a plurality of interconnected belt segments including a substrate having an electrically conductive digital data bus, and at least one module having a first sensor, a second sensor and a digital signal processor, and a coating for protecting the belt segment. The first and second sensors, which are preferably formed as microelectromechanical sensors sharing a common substrate, respectively generate signals representative of a first physical parameter and a second physical parameter. The processor receives and analyzes the first and second signals to generate a third signal. The third signal is transmitted along the electrically-conductive bus to a remotely-located controller. The controller analyzes the third signal to obtain flight status information relating to the effect of the physical parameters on the flight.

29 Claims, 3 Drawing Sheets

SYSTEM AND METHOD FOR MEASURING PHYSICAL PARAMETERS USING AN INTEGRATED MULTISENSOR SYSTEM

FIELD OF THE INVENTION

This invention relates to a system and method for measuring and analyzing physical parameters about a surface of an object using an integrated multisensor system.

BACKGROUND INFORMATION

The prior art has generally recognized the need for measuring and analyzing physical parameters achieved at discreet locations about the surface of an object, often in the context of an object moving through a particular fluid. Examples include measuring the physical parameters achieved about the surface of a boat hull as it moves through water, or about the airframe of an aircraft during flight. Another example includes measurement of stress and strain achieved at discreet locations about a load-bearing structure.

By way of example, aircraft pilots and designers require information detailing the effects of physical conditions on an aircraft during flight. Designers use testing devices placed about an airframe of an aircraft to create flight loads surveys, which measure physical parameters across various parts of the airframe during flight. A typical flight load testing system monitors physical parameters about the body, wings, tail, nacelle and engine of an aircraft. Such flight load testing systems are typically either removably affixed to an aircraft or are integrally mounted into the airframe of an aircraft for use in regular flight operations.

A typical flight load testing system includes a series of pressure sensors disposed within pneumatically-controlled plastic tubes that are removably affixed to the aircraft. The tubes are placed about the airframe of an aircraft at various positions to gather sensor data relating to the physical parameters affecting the airplane during flight. Leads extend from each tube to a remote data processing device having signal conditioning electronics. Such removable testing systems are typically cumbersome to install and are expensive to operate and maintain. Additionally, the testing systems increase the weight and drag along the airframe of the aircraft, which results in a lack of accuracy in determining physical parameter data during the flight tests.

An example of a type of physical parameter testing system is disclosed in U.S. Pat. No. 5,001,638 to Zimmerman et al. The Zimmerman '638 patent discloses an integrated aircraft air data system which includes first sensors mounted to the airframe for measuring pressure along the airframe, and second sensors mounted to the airframe measuring total temperature. The first and second sensors are typically mounted at separate locations and send analog outputs along a bidirectional data bus to a centrally-located air data unit. The analog outputs are converted to digital signals at the centrally-located air data unit. The air data unit then provides air pressure and temperature data for the aircraft's cockpit instrumentation and for controlling the aircraft's engines.

SUMMARY OF INVENTION

A system and method for measuring physical parameters at a plurality of discrete locations about a surface of an object is provided. The system comprises a multisensor system including at least one belt segment having a plurality of sensors and processors in communication with a remotely-located controller along an electrically-conductive, bidirectional digital data transfer bus. For example, where the system is applied to collect aircraft flight data, a plurality of interconnected belt segments are disposed about the body, wings, nacelle, tail and engine of the aircraft to provide measurements of various physical parameters during a flight loads survey of an aircraft configuration. The multisensor system may be used in a variety of different applications, including measuring physical parameters about the rotors of a helicopter, about the hull of a boat or submarine, and about the body of an automobile.

In accordance with the invention, each belt segment includes a polymeric tape carrier having integrally-formed wire traces defining a portion of the system's electrically-conductive bidirectional digital data bus; two or more parameter-sensing modules affixed to the tape carrier in electrical communication with the bidirectional digital data bus; and a coating for protecting the tape carrier and the modules from environmental conditions, as well as to provide the belt segment with improved aerodynamic properties. Where the physical parameters are to be measured as the object moves through a given fluid, the tape carrier has a generally planar surface and a nominal thickness that is significantly less than the boundary separation layer defined upon movement of the object through the fluid. In this manner, the belt segment is provided with a reduced aerodynamic profile to allow for more accurate physical parameter measurements.

In the event that two or more belt segments are employed, each belt segment has end portions adapted for interconnection with an adjacent belt segment. An interconnection device, such as a low-profile connector, physically and electrically interconnects adjacent belt segments to connect the module-mounted sensors/processors of each belt segment with a remotely-located controller, such as a network-capable application processor (NCAP).

A combination of one or more protective coatings encapsulates at least a portion of each belt segment and module. The coatings not only protect the belt segment from adverse environmental conditions, but also define an aerodynamic surface on each belt segment. By way of example only, the coating may either be comprised entirely of one compound or may be a multilayer combination of organic or inorganic compounds, preferably a bi-layer or tri-layer combination, suitably engineered to provide the best combination of environmentally protective and aerodynamic properties.

Each of the modules affixed to the tape carrier includes a pair of sensors, each sensor generating an analog signal representative of its respective physical parameter; an analog integrated circuit (IC) to provide signal conditioning for the analog signal generated by each sensor; a memory IC; an analog-to-digital converter; and a digital signal processor. Interconnection leads provide electrical communication between the digital signal processor of each module to the data bus defined in the tape carriers, thereby providing communication pathways between the modules and the NCAP.

More specifically, the first sensor attached to each module measures a predetermined physical parameter and generates a signal representative of the physical parameters measured. The second sensor is attached to the module adjacent to the location of the first sensor. The second sensor also measures a predetermined physical parameter and generates a signal representative of the physical parameter measured. By way of example only, the physical parameters to be measured by the first sensor may be pressure and temperature by the second sensor. The first and second sensors generate analog signals based on the physical parameter measurements, which are then processed and amplified by an analog integrated circuit (IC), and are then converted to digital signals. The digital signal processor uses the signal from the second sensor to effect correction on the signals generated by the first sensor.

Additional physical parameters measured by the sensors may include, without limitation, static pressure, absolute temperature, acceleration, chemical environment, mechanical strain and component aging. In a preferred embodiment of the invention, the first and second sensors are formed on a common substrate, which is bonded to the module substrate. Alternatively, the sensors may be formed by a multiplicity of processes which otherwise result in a given pair of first and second sensors being attached to the same module. The modules are then attached in an array, preferably a one-dimensional array, along the surface of the tape carrier.

A digital signal processor is affixed to each module proximate to the location of the first sensor. The processor receives and analyzes the physical parameter signals respectively generated by the module's pair of first and second sensors. The processor itself is in electrical communication with the bidirectional digital data bus through electrical interconnection paths, such as tape automated bonds (TAB), whereby the processor transmits both the processor node address and the third processed digital signal along the tape carrier's integrated bidirectional data bus to the network capable application processor (NCAP).

A remotely-located controller, normally disposed within the airframe of an aircraft, is electrically connected to the bidirectional digital data buses of the one or more belt segments. In a preferred embodiment, the controller is part of the network-capable application processing device (NCAP). The controller communicates with each belt segment's modules to collect the third signal generated by each digital signal processor. The controller analyzes the collected third signals based on a predetermined set of instructions. The controller communicates with the modules using a standard protocol over the system's shared electrically-conductive digital data buses.

In a preferred embodiment, the controller assesses the integrity of the third signals generated by the digital signal processor of each module, as well as sending commands to the module about when a measurement should be taken and verifying the health status of the plurality of modules. Alternatively, the controller can forward the data to the instruments on the aircraft to provide flight status information during operation of the aircraft. Additionally, the controller may store the physical parameter data collected during aircraft flight, possibly to be downloaded by aircraft maintenance support personnel after completion of the flight. The controller may also transmit the physical parameter data via a wireless interface to the ground.

DETAILED DESCRIPTION OF THE INVENTION

Figure 1:
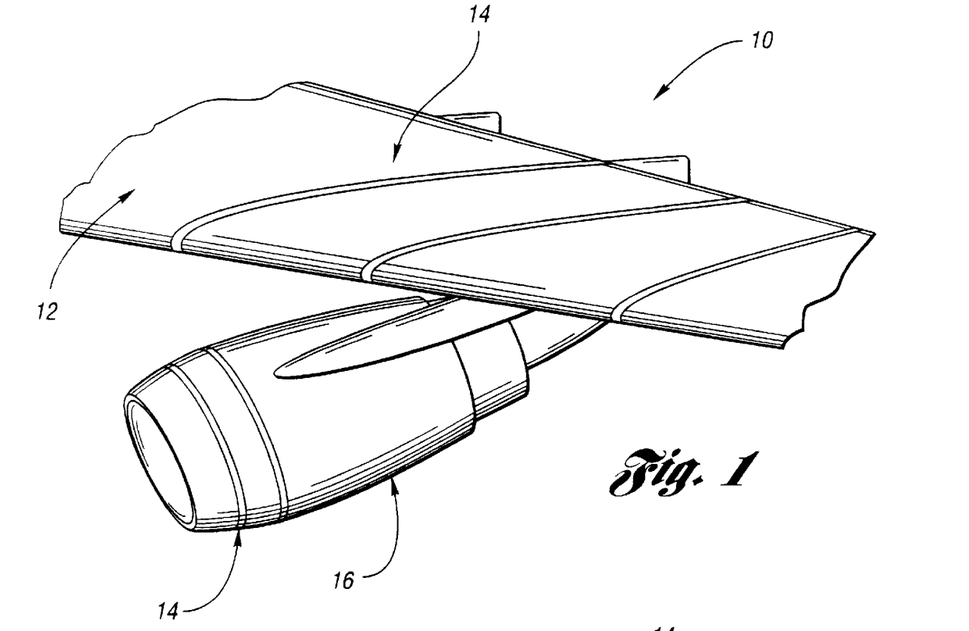
FIG. 1 is a perspective view of a portion of the airframe of an aircraft, wherein an array of belt segments of an exemplary multisensor system are attached to the aircraft's wing and nacelle.

Referring to FIG. 1, a multisensor system 10 for measuring physical parameters achieved at discrete locations about the surface of an aircraft 12 during flight includes an array of interconnected belts 14. As seen in FIG. 1, the array of interconnected belts 14 is mounted to the aircraft's airframe, such as the aircraft's wing and nacelle of the aircraft 12. It will be appreciated that other suitable locations for deploying the belts 14 to collect aircraft flight data include select surfaces on the body, wings, nacelle, tail and engine of the aircraft 16. And, in the exemplary system 10 illustrated in the drawings, the belts 14 are disposed about the surface of the airframe so as to define a two-dimensional array along the airframe to allow for physical parameter measurements at multiple locations about a common surface.

Each belt 14 includes at least one sensor-carrying belt segment 18. More specifically, as seen in the exemplary system 10 illustrated in FIGS. 2 and 3, each belt segment 18 includes a relatively-flexible substrate, such as a thin polymeric tape carrier 20; at least two parameter-sensing modules 22 affixed to the tape carrier 20, and a protective coating 24 covering at least a portion of both the tape carrier 20 and the modules 22.

Figure 2:
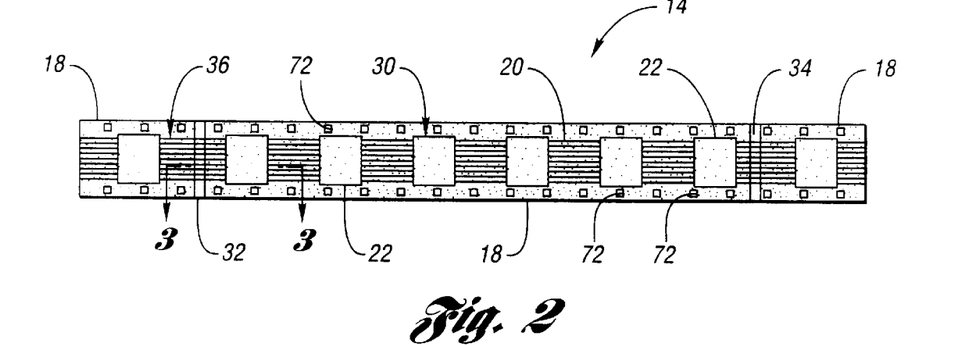
FIG. 2 is a top view of a portion of the array of belt segments of the exemplary system.
Figure 3:
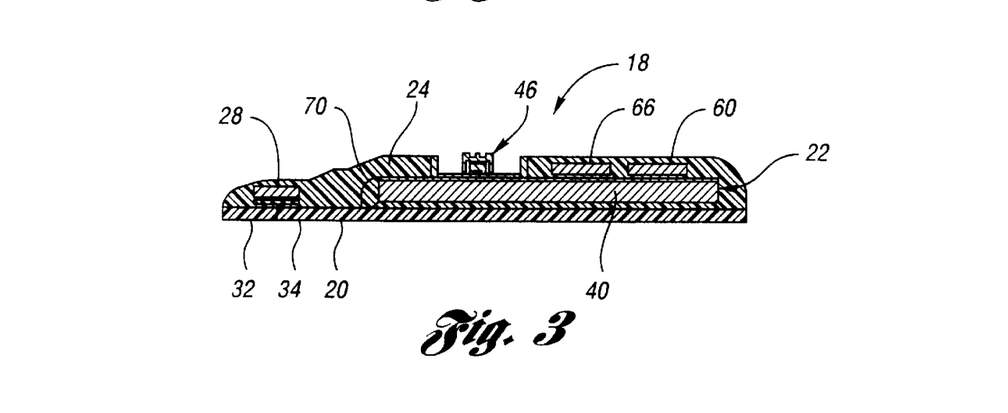
FIG. 3 is a transverse cross-sectional view along line 3—3 of FIG. 2.

More specifically, in the exemplary system 10, the tape carrier 20 forming the substrate of each belt segment 18 has a nominal thickness such that the total thickness of the belt segment is significantly less than the thickness of the boundary separation layer defined about the aircraft during flight. The reduced nominal tape carrier thickness creates a relatively aerodynamic profile for the belt segment 18, thereby allowing the modules 22 on each belt segment 18 to take more accurate physical parameter measurements, while the tape carrier material is selected to allow the belt segment 18 to conform to non-planar surfaces of the airframe. The tape carrier material is also preferably selected to otherwise reduce the weight of each belt segment 18.

Thus, by way of example only, in a constructed embodiment of the exemplary system 10, wherein each belt segment 18 is about 305 mm (12 inches) in length, the tape carrier 20 is preferably formed of a polymeric material having a thickness in the range of 0.025 mm to 0.25 mm (0.001 inches to 0.01 inches). Up to six parameter-sensing modules 22 are mounted on each 305 mm belt segment 18.

A series of wiring traces 30 are integrally formed into the tape carrier 20 of each belt segment 18. An interconnection device, such as a low-profile connector 28, is used to physically and electrically interconnect the end portions 32,34 of adjacent belt segments 18. Together, the electrically interconnected wiring traces 30 of the belt segments 18 define a bidirectional data transfer bus, indicated generally at 36, which extends along the entire length of each belt 12. The bus 36 allows both digital and analog signals to pass along the interconnected belt segments 18 between the modules 22 and a remotely-located controller 38, to be described in greater detail below.

Figure 4:
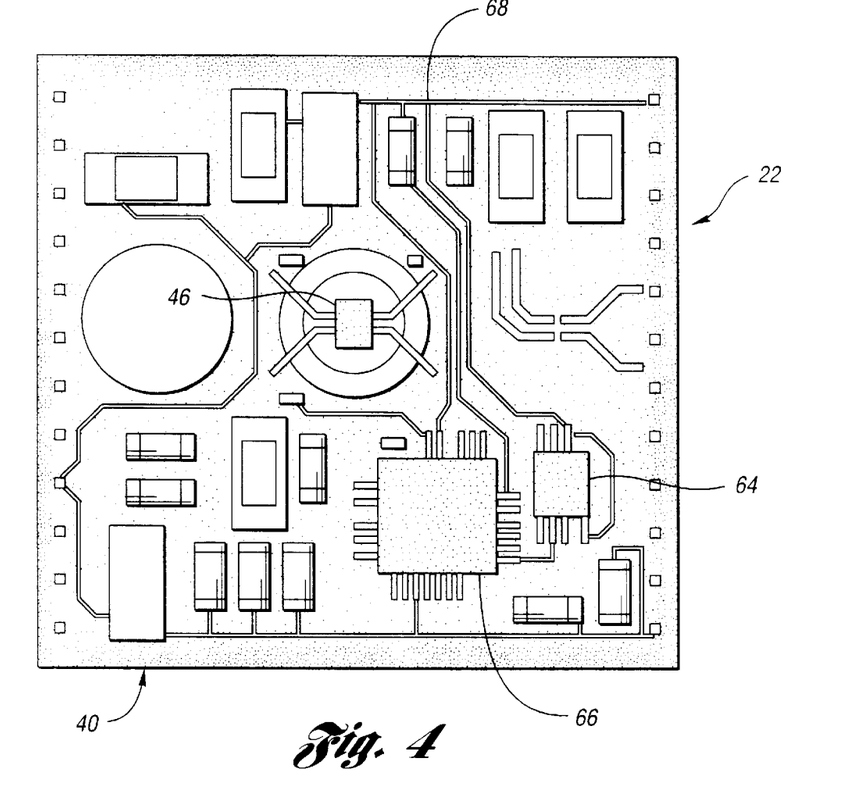
FIG. 4 is a top view of a parameter-sensing module prior to attachment to a belt segment.

As seen in FIGS. 2–4, the modules 22 attached to each belt segment 18 each include a module substrate 40 formed, for example, of oxidized silicon. A pair of analog-output physical-parameter-data sensors 42,44 are centrally mounted in close proximity on top of each module substrate 40. While the invention contemplates use of any suitable sensors, in a constructed embodiment of the exemplary system 10, the sensors 42,44 are piezoresistive sensors.

Figure 5:
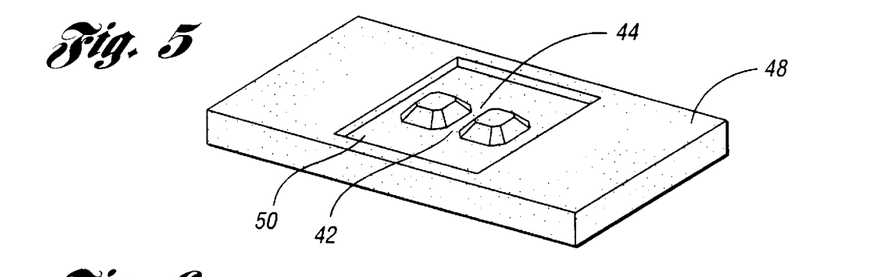
FIG. 5 is a top perspective view of a microelectromechanical sensor of the exemplary system.
Figure 6:
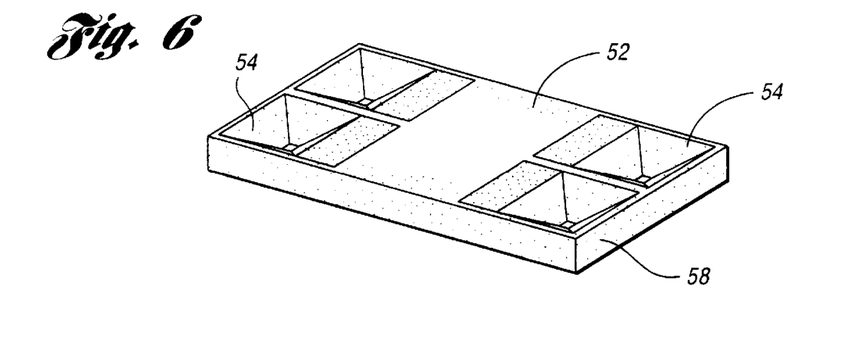
FIG. 6 is a bottom perspective view of the microelectromechanical sensor shown in FIG. 5.
Figure 7:
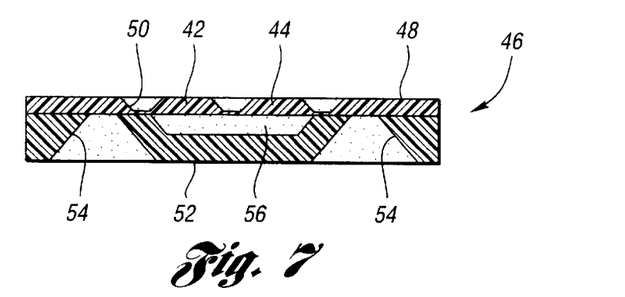
FIG. 7 is a cross-sectional view of the microelectromechanical sensor shown in FIGS. 5 and 6.

Referring to FIGS. 5–7, in the exemplary system 10, the first and second sensors 42,44 are absolute-reference micromachined silicon sensors advantageously formed on a common substrate to form a microelectromechanical system (MEMS), indicated generally at 46. The MEMS 46 is itself attached to the module substrate using a conductive epoxy. Moreover, in the exemplary system 10, the MEMS 46 is designed to have a low profile to increase the aerodynamic efficiency and accuracy of the physical parameter measurement process. Thus, in a constructed embodiment, MEMS 46 has a profile of less than 1 mm. The first sensor 42 is part of a micromachined pressure diaphragm capable of generating a first analog signal representative of absolute static pressure up to perhaps about 103.5 kPa (about 15 psia). The second sensor 44 generates a second analog signal representative of absolute temperature in a range of about –50° C. to about 85° C.

It will be appreciated, however, that, depending upon the application to which the multisensor system of the invention is being put, the first and second sensors 42,44 may generate analog signals representative of other sensed physical parameters, including, without limitation, acceleration, chemical environment, mechanical stress, mechanical strain and component aging. In this regard, each module 22 may also advantageously include additional sensor mounting locations 46 on either side of the center-mounted sensors 42,44. Additional sensors may thus be mounted on either side of the first and second sensors 42,44 for measuring additional physical parameters, including evaluating the differences in the first and second sensor's stress sensitivity. Where desired, the invention contemplates use of suitable mechanisms for mechanically isolating a given sensor from the tape carrier 20 to improve sensor performance.

Returning to FIGS. 5–7, in the exemplary system 10, the MEMS 46 includes a top surface 48 having a recessed area which forms a diaphragm 50 containing the first and second sensors 42,44, and a bottom portion 52 having a plurality of recesses 54. The second sensor 44 is located proximate to the first sensor 42 on the back surface of diaphragm 50 inside cavity 56 in order to preserve sensor reliability/measuring accuracy.

The bottom portion 52 of the MEMS 46 includes a cavity 56 defined within a reference support 58. The reference support 58 is designed to allow flip chip bonding of the MEMS 46 to the module substrate 40 of the module 22. The MEMS 46 is mounted to the module 22 using solder bumps or conductive epoxy. The use of flip chip bonding keeps the profile of the module-mounted MEMS 46 to about 0.41 mm (0.016 inches) thick. The reference support 58 advantageously provides feedthroughs so that electrical connections can be made from the backside of the MEMS 46. The feedthroughs consist of etched holes through the reference support 58. A suitable barrier metal, such as gold, is deposited through the etched holes, creating electrical pads on the surface of the reference support 58 to connect them to the pads of the surface micromachined sensors 42,44.

The MEMS 46 incorporates a fully-active Wheatstone bridge strain sensing circuit on the internal surface of the diaphragm 50. The vacuum reference is accomplished with a second reference support 58 attached to the back of the diaphragm 50. The second reference support is hermetically glass sealed to the sensor and has a cavity which is evacuated during the sealing process. The cavity always presents the stable reference vacuum to the back side of the diaphragm 50.

Returning to FIGS. 2–4, each module 22 also includes an analog signal-conditioning integrated circuit (IC), for example, an analog signal-conditioning processor 60 optimized for piezoresistive sensors. In a constructed embodiment, the analog signal conditioning processor 60 is bonded to the module substrate 40 using a non-conductive epoxy. It will be appreciated, however, that the analog signal-conditioning processor 60 may otherwise provide suitable signal conditioning for other types of transducers employed on the module 22, including piezoelectric, piezoresistive, variable capacitance, variable charge and strain gages.

Each module 22 further includes a memory IC 64, an analog-to-digital converter, a digital signal processor 66, and associated circuitry, indicated generally at 68, for electrically interconnecting the first and second sensors 42,44 with the other module components 60,64,66. The digital signal processor 66 communicates with the bidirectional data bus 36 defined in the tape carrier 20, and power is provided to module components, via suitable electrical interconnection paths 70. By way of example only, in the exemplary system 10, the electrical interconnection path 70 is provided by tape automated bonds (TAB).

The digital signal processor 66 additionally contains a digital filter, a correction engine and a microcontroller to provide basic operational functions for the module 22. Each digital signal processor 66 has a specific node address which identifies the processor to the remotely-located controller 38. The digital signal processor 66 collects and analyzes the first and second analog signals which have been respectively generated by the first and second sensors 42,44, amplified by the analog signal-conditioning processor 60, and converted to digital signal by the analog-to-digital converter. The digital signal processor 66 generates a third, digital signal, based on the conditioned/amplified and digitally-converted first and second analog signals, which is thereafter transmitted to the controller 38 in response to a call signal, as described more fully below. In accordance with one feature of the invention, the digital form of the third signal ensures that signal integrity is maintained during its transmission along the data bus 36 to the controller 38.

A series of registration marks 72 are preferably provided on the tape carrier 20 to facilitate attachment of the modules 22 to the tape carrier 20 at specified discrete locations thereon, whereby the module-mounted sensors 42,44 define a one-dimensional sensing array along the length of the belt segment 18. A two-dimensional sensing array may thus be achieved by using multiple belts 14, each of which includes at least one physical-parameter-data-sensing belt segment 18, as illustrated in FIG. 1. Alternatively, the invention contemplates placement of the modules 22 on each belt segment 18 such that the module-mounted sensors 42,44 themselves define a two-dimensional sensing array.

Referring again to FIGS. 2 and 4, as noted above, a protective coating 24 encapsulates a portion of each interconnected belt segment 18. The coating 24 protects the belt segments 18 from environmental conditions during the aircraft flight and otherwise provides the belts 14 with an aerodynamic surface. In the exemplary system 10, constructed embodiment, the coating 24 covers the entire belt segment 18 except for the recessed area 50 of the top surface 48 of the MEMS 46. The uncoated recessed area 50 of the MEMS 46 allows the first and second sensors 42,44 to directly measure their respective physical parameters.

The coating 24 may be formed from a single compound, or it may comprise a multilayer combination of organic or inorganic compounds, preferably a bi-layer or tri-layer combination, suitably engineered to provide the best combination of environmentally protective and aerodynamic properties. For example, in a constructed embodiment, a tri-layer coating is employed: the first layer, designed to provide a humidity barrier for the module's circuitry 68, is formed of a coating material such as Hysol Dexter FP4460 epoxy. The second layer, designed to provide an aerodynamically-smooth surface profile, is formed of a conformal coating material such as Dow Corning DC 3-1753. The third layer, designed to prevent water invasion at the base region of the MEMS 46, is formed of a protective material such as Dow Corning DC Q1-4939.

Figure 8:
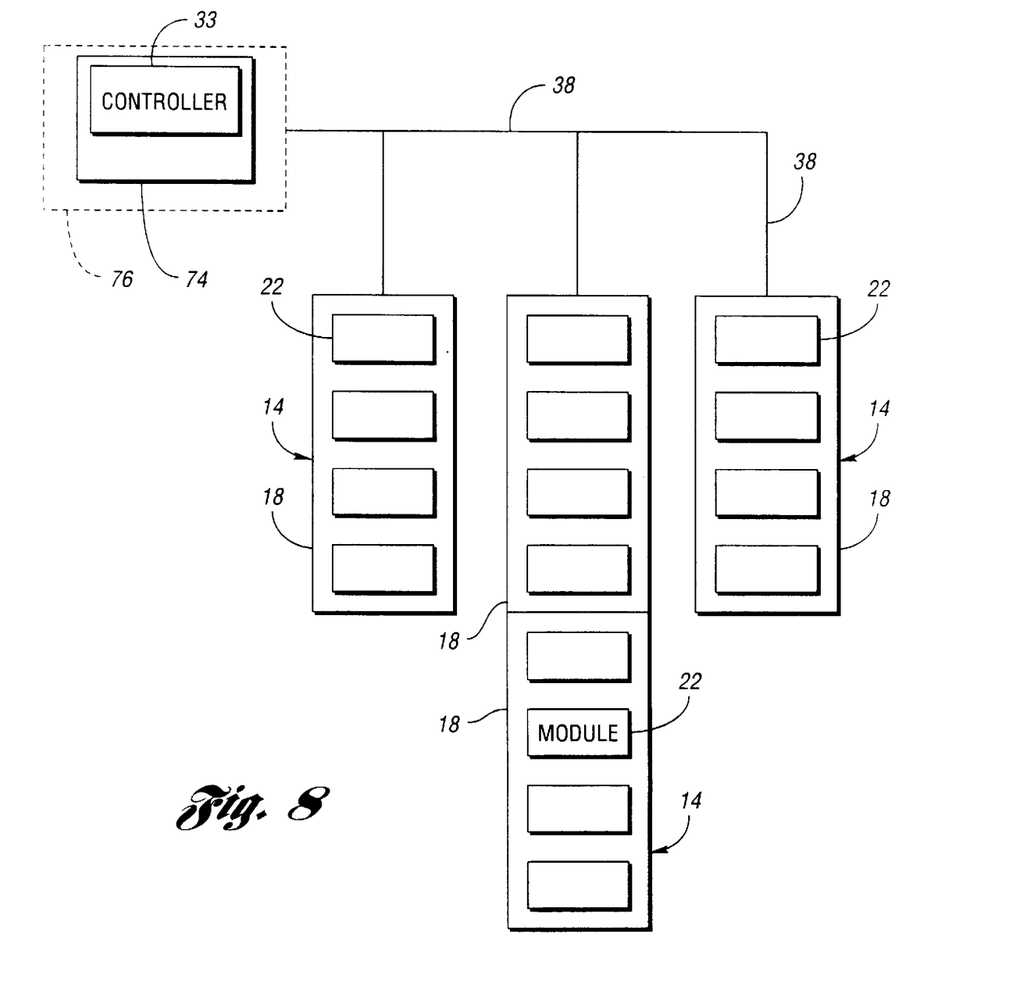
FIG. 8 is a diagrammatic schematic of the exemplary system illustrating the communication pathways of the electrically-conductive data bus including the interface module between the array of belt segments and the remotely-located controller.

A diagrammatic schematic overview of the exemplary system 10 is illustrated in FIG. 8. In FIG. 8, the array of interconnected belts 14, themselves disposed about the surface of the aircraft 12 to thereby place the parameter-sensing modules 22 of each constituent belt segment 18 at a plurality of discrete locations about the surface of the airframe (not shown). The bidirectional data bus 36 defined by the interconnected belts 14 is itself connected to a remotely-located controller 38. In a constructed embodiment of the exemplary system 10, the controller 38 is part of a network capable application processor (NCAP), indicated generally at 74, which can be connected to a communication network used to interface to a host computer, indicated generally at 76. In an alternative embodiment, the controller 38 can be configured as a host computer to interface directly with the communication network without the use of the network capable application processor.

As noted above, the digital signal processor 66 of each segment-mounted module 22 communicates with the remotely-located controller 38 across the bidirectional data bus 36 integrally-formed within each belt's tape carrier 20. The data bus 36 includes a high speed bus and a low speed bus for communication between each module's digital signal processor 66 and the controller 38. The high speed data bus is used for time-critical operations such as data transfers between each digital signal processor 66 and the controller 38, sample synchronization and memory download/self-identification protocols. The low speed data bus is used for non-time critical operations, such as command and status operations, as well as support of the self-identification protocol.

In the exemplary system 10, the third, digital signals generated by each digital signal processor 66 are transferred along the data bus 36 to the controller 38 using a smart transducer series protocol such as IEEE P1451 or equivalent. The controller 38 performs hardware address filtering for all signal packets and hardware command decoding for specific commands. This allows the controller 38 to provide deterministic time response to specific commands, such as the trigger command, to collect signals transmitted from each module's digital signal processor 66.

The controller 38 preferably includes a control program and a downloader program to interface the controller 38 with each digital signal processor 66. The control program is designed to support initial checkout between each digital signal processor 66 and the controller 38. The control program provides integrated access to the high speed and low speed data buses 36. The downloader program supports the interface between each digital signal processor 66 and the controller 38, as well as processor memory upload and download access via the low speed bus. Each of the programs on the controller 38 use a command-line based interactive design to allow a user to enter commands to be carried out by the software. Information gathered by the controller 38 can then be transmitted along a communications network to the host computer 76 to report flight status information. The controller 38 assesses the integrity of the signals received from each digital signal processor 66. The controller 38 additionally sends commands to each digital signal processor 66, instructing each processor as to when a parameter measurement should be taken and verifying the health status of each module 22.

In accordance with another feature of the invention, an exemplary method of measuring physical parameters about the surface of an object, such as the airframe of an aircraft 12, using a multisensor system 10 as described above is provided. During the operation of the aircraft 12, the first sensor 42 of each segment-mounted module 22 generates a first analog signal representative of a first preselected physical parameter, such as static pressure, while the second sensor 44 generates a second analog signal representative of a second preselected physical parameter, such as absolute temperature. After suitable conditioning and amplification in the analog signal-conditioning processor 60, the first and second analog signals are digitally-converted in the analog-to-digital converter 64 and supplied to the digital signal processor 66 on the module 22.

The digital signal processor 66 analyzes the first and second digital signals to generate a third digital signal based on first and second signals. By way of example only, in the exemplary method, the second (temperature) signal is used to normalize the first (static pressure) signal to thereby account for temperature effects on the first sensor 42. The digital signal processor 66 transmits the digital third signal, along with the specific processor node address identifying its respective module 22, to the remotely-located controller 38 along the high speed electrically-conductive data bus 36.

Additionally, digital signal processor 66 can transmit data taken from sensors 42,44, or other sensors resident on module 22 as described above, which may be combined through a predetermined method to generate additional digital signals. These additional signals may preferably be communicated to controller 38 on separate channels in the data bus 36.

In accordance with the invention, in the exemplary method, the controller 38 sends instructions to each digital signal processor 66 along the data bus 36 to transmit the third digital signal generated by the digital signal processor 66 of each module 22. The controller 38 collects the thus-transmitted digital third signals, as well as the specific node address of each digital signal processor 66. The controller 38 analyzes the collected third signals based on a predetermined set of instructions. The controller 38 then forwards the data from the signals on to a host computer 76 through the network capable application processor 74 in a communication network to provide flight status information during operation of the aircraft 12. Alternatively, the controller 38 may be configured to act as a host computer to analyze the flight status information during the operation of the aircraft 12. Additionally, the controller 38 may collect physical parameter data during the aircraft flight and store such data in suitable memory (not shown), to be downloaded by aircraft maintenance support personnel after completion of the flight. The controller 38 may also transmit the collected physical parameter data via a wireless interface to the ground.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the invention has been described in the context of an aircraft's flight data survey, it will be appreciated that the multisensor system 10 may be used in testing systems for other modes of transportation, including measuring physical parameters about the rotors of a helicopter, about the hull of a boat or submarine, or about the body of an automobile. Additionally, while each module 22 on a given belt segment is illustrated in the Drawings as completely overlying the tape carrier 20, the invention contemplates use of belt segments 18 whose parameter-sensing modules 22 extend, for example, laterally beyond the confines of the tape carrier 20. Thus, for example, where one of the physical parameters to be measured with the multisensor system is mechanical strain, the MEMS 46 may preferably extend laterally beyond the tape carrier 20 to thereby mechanically isolate the module-mounted sensors from the tape carrier 20 and, hence, improve the sensitivity of the multisensor system.

What is claimed is:

1. A multisensor system for measuring physical parameters at a plurality of discrete locations about a surface of an object, the system comprising:
    at least one belt segment, wherein each belt segment includes an electrically-conductive data bus that is in communication with the data bus of another belt segment;
    a plurality of parameter-sensing modules mounted at a plurality of positions on each belt segment corresponding to the discrete locations, each module including a first sensor for generating a first signal representative of a first one of the physical parameters, a second sensor for generating a second signal representative of a second one of the physical parameters, and a processor, in electrical communication with the data bus, receiving the first and second signals and generating a third signal based on the first and second signals, wherein the third signal is a digital signal; and
    a controller connected to the data bus for selectively receiving the third signal from the processor of each of the modules.

2. The system of claim 1, wherein the first sensors of a given belt segment define a one-dimensional sensing array.

3. The system of claim 1, wherein the first sensor and the second sensor are electromechanical devices which share a common substrate.

4. The system of claim 2, wherein the first one of the physical parameters is static pressure.

5. The system of claim 4, wherein the first one of the physical parameters is static pressure measured in the range of 0 to about 15 psia.

6. The system of claim 1, wherein the second one of the physical parameters is absolute temperature.

7. The system of claim 6, wherein the second one of the physical parameters is absolute temperature in the range of about −50° C. to about 85° C.

8. The system of claim 1, including a connector for physically interconnecting one belt segment to another belt segment, wherein the connector forms an electrical connection between the data buses of the one belt segment and the other belt segment.

9. The system of claim 1, wherein each belt segment further includes a thin, elongate, flexible substrate.

10. The system of claim 9, wherein the substrate include a plurality of wiring traces defining a portion of the data bus.

11. The system of claim 9, further including a protective coating overlying the substrate and at least a portion of each module.

12. The system of claim 11, wherein the coating defines an aerodynamic surface on the belt segment.

13. The system of claim 1, wherein the processor generates at least one additional digital signal based on the first and second signals.

14. The system of claim 1, wherein the third signal is transmitted over a first channel in the data bus, and the additional signal is transmitted over a second channel in the data bus.

15. A multisensor system for measuring physical parameters of flight data at a plurality of discrete locations about a surface of an aircraft, the system comprising:
    at least two belt segments, wherein each belt segment includes a connecting portion at each end of the segment to interconnect the belt segments, wherein each belt segment includes an electrically-conductive data bus that is in communication with the data bus of another belt segment;
    a plurality of modules disposed on each of the belt segments, wherein each module includes a first sensor for generating a first signal representative of a first one of the physical parameters, a second sensor for generating a second signal representative of a second one of the physical parameters, and a processor receiving the first and second signals and generating a third, digital signal based on the first and second signals, the processor being in electrical communication with the data bus;
    a remote controller connected to the data bus for receiving the third signal generated by the processor of each of the plurality of modules.

16. The system of claim 15, wherein the first sensors of the modules of the at least two belt segments define in a two-dimensional sensing array.

17. The system of claim 16, wherein each belt segment is parallel to an adjacent belt segment when disposed on the aircraft in a two-dimensional array.

18. The system of claim 15, wherein the first sensor and the second sensor are electromechanical devices which share a common substrate.

19. The system of claim 15, wherein the first sensors are disposed in a one-dimensional array on each belt segment.

20. The system of claim 15, wherein the first one of the physical parameters is static pressure in the range of 0 to about 15 psia.

21. The system of claim 15, wherein the second one of the physical parameters is absolute temperature in the range of about −50° C. to about 85° C.

22. The system of claim 15, including a connector for interconnecting each belt segment to another belt segment, wherein the connector forms an electrical connection between the data buses of adjacent belt segments.

23. The system of claim 15, further including a protective coating overlying each interconnected belt segment and at least a portion of each module.

24. The system of claim 23, wherein the coating defines an aerodynamic surface on the interconnected belt segments.

25. A method of measuring physical parameters of flight data at a plurality of discrete locations about a surface of an aircraft, the method comprising:

generating, at each of the plurality of discrete locations, a first signal representative of a first one of the physical parameters;

generating, for each of the discrete locations, a second signal representative of a second one of the physical parameters;

generating, at each of the discrete locations, a third signal based on the first and second signals;

transmitting the third signal generated at each of the discrete locations along an electrically-conductive bidirectional data bus; and collecting the third signal with a remote controller connected to the data bus.

26. The method of claim 25, wherein the step of collecting the third signal with a remote controller further comprises the step of analyzing the third signal with the remote controller to provide flight status information.

27. The method of claim 25, wherein the step of generating the first signal representative of the first physical parameter comprises the step of measuring static pressure in the range of 0 to about 15 psia.

28. The method of claim 25, wherein the step of generating the second signal representative of the second physical parameters comprises the step of measuring absolute temperature in the range of about −50° C. to about 85° C.

29. The method of claim 25, wherein the collecting step includes calling for transmission of the third signal generated at each of the discrete locations.

* * * * *

UNITED STATES PATENT AND TRADEMARK OFFICE
CERTIFICATE OF CORRECTION

PATENT NO. : 6,134,485

DATED : October 17, 2000

INVENTOR(S) : Minas H. Tanielian, Namsoo Kim, and Mark J. Holland

It is certified that error appears in the above-identified patent and that said Letters Patent is hereby corrected as shown below:

6,134,485

ON THE TITLE PAGE

Please correct the name of inventor Kim to Namsoo Kim from Namsoo Kim

Signed and Sealed this

Eighth Day of May, 2001

Attest:

NICHOLAS P. GODICI

Attesting Officer    Acting Director of the United States Patent and Trademark Office